Aug. 3, 1937.   P. A. SCHWERTNER   2,089,004
DISPENSER DEVICE
Filed Nov. 16, 1936

INVENTOR.
P. A. Schwertner
BY
C. F. Heinkel
ATTORNEY.

Patented Aug. 3, 1937

2,089,004

UNITED STATES PATENT OFFICE 2,089,004

DISPENSER DEVICE

Paul A. Schwertner, Euclid, Ohio

Application November 16, 1936, Serial No. 110,957

3 Claims. (Cl. 221—60)

The present invention relates to dispensing of substances such as pastes, or analogous or similar, usually dispensed from collapsible tubes or the like.

Objects of the present invention are:—

To provide a device which is or may be made stationary and grips an end of a dispensing tube and, upon manipulation of the device, successively collapses the tube and squeezes substance out of the other end thereof.

To provide such a device with an easy and conveniently operable means for engaging an end of a tube and successively collapse the tube by winding the engaged end onto this operating means when the latter is rotated.

To provide such a device with means whereby it can easily and conveniently be secured to a wall or other support and thereby held stationary and positionally fixed so that both hands are free for operating the device and for holding an object steady at or near the discharging end of the tube to avoid spilling of substance.

To make such a device simple of structure and easy of operation, economical in dispensing of substance and efficiently limiting the amount of substance to be dispensed and this limiting being controlled by the same means which controls the dispensing.

Other objects will be pointed out in the description of the device shown in the accompanying drawing or will become obvious or apparent or will suggest themselves upon an inspection of this specification and the accompanying drawing.

In the prior art, relating to dispensing of substance from collapsible tubes or the like, one end of the tube is squeezed to push substance out of the other end. This squeezing usually results in more substance being squeezed out than is necessary or desired due to the uncertain control of the squeezing and results in waste of substance as well as soiling of fixtures and hands and articles such as tooth brushes or the like. The prior art devices must be held by one hand, the tooth brush or the like by the other and the squeezing must be done as best can be done since there is no other hand nor any particular means for doing the squeezing. This is quite inefficient and results in much waste of substance and also entails much handling of the tube and tooth brush or the like and considerable loss of time.

The present invention corrects the above mentioned inconveniences and disadvantages by providing a device which can be made stationary and fixed thus leaving both hands free to control the squeezing out of substance and manipulating the tooth brush or the like and thereby saves much substance and much time by the present device.

The present invention is illustrated in the accompanying drawing, forming part of this specification, in which.

Similar reference characters refer to similar parts throughout the views.

The device shown in the accompanying drawing for illustrating purposes will now be described. It is to be noted, however, that such showing and the following description thereof is not the only embodiment of the present invention and that changes and modifications can be made therein as to structure and relations of parts within the scope and spirit of the present invention and of the appended claims.

Figure 1:
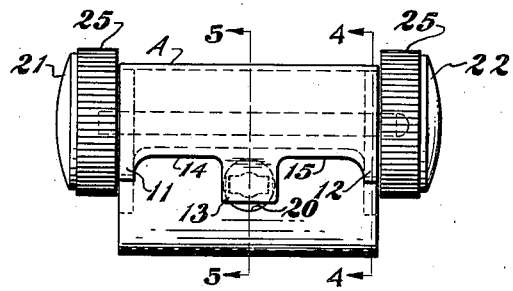
Fig. 1 is a front view of a dispenser device embodying the present invention.
Figure 2:
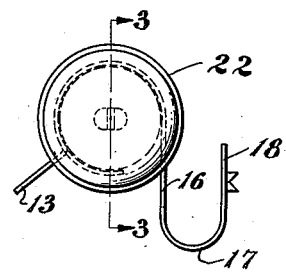
Fig. 2 is an end view of Fig. 1 showing the general relations of the parts of this particular device.
Figure 3:
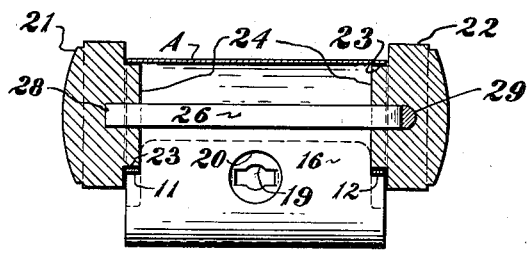
Fig. 3 is a longitudinal section of Fig. 1; the section being taken on the line 3—3 shown in Fig. 2.
Figure 4:
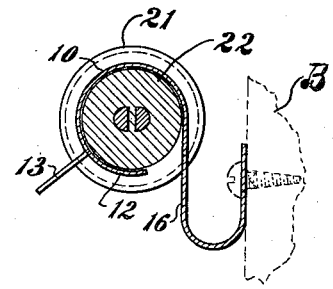
Fig. 4 is a transverse section of Fig. 1; the section being taken on the line 4—4 shown in Fig. 1.
Figure 5:
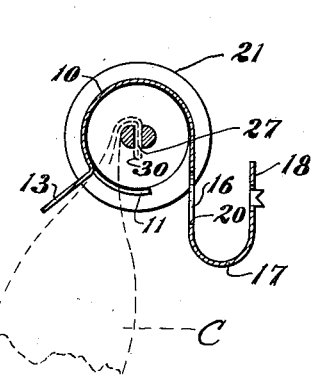
Fig. 5 is a transverse section of Fig. 1; the section being taken on the line 5—5 shown in Fig. 1.
Figure 6:
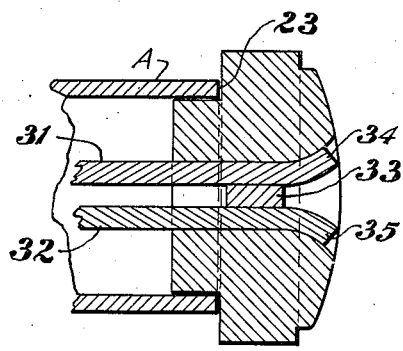
Fig. 6 is a longitudinal section, on a larger scale, of an end of a device made of composition material throughout except the tube gripping members.

The base A of the dispenser device shown in the accompanying drawing, made of metal in Fig. 1 or of a composition in Fig. 6, has the circular part 10 terminating at each end into the band like portions 11 and 12 and at the middle thereof into the tongue 13. The cut away parts 14 and 15 provide an opening for easy and convenient sight into the base. The apron part 16 of the case depends from the circular part 10 and extends down some distance and terminates in the loop 17 and the upwardly extending part 18 which has the hole 19 therethrough for the reception of a screw whereby the device may be fastened to a support B in the present instance. The hole 20 is provided in the part 16 for access to a screw from the front of the device.

The knobs 21 and 22, at each end of the base, are both shown as being made of composition material such as hard rubber or any of the now known materials in common use and each has the shoulder 23 to abut the base and the circular part 24 extending a little distance into the base and fitting loosely into the respective band portions 11 and 12. Thusly, both knobs are journaled in the base and can rotate relative thereto. The outer circumferential surface of the knobs are, preferably provided with knurlings or serrations 25 for better taking hold thereof for rotation thereof.

The tube gripping element 26 for Fig. 1 is made of one piece of metal, half round in cross-section, the middle portions being shown parallel with the space 27 between them and the ends 28 and 29 serving to retain the spacing and being embedded in the material of the corresponding knob, preferably by and during the formation of the knob.

The device shown in Fig. 1 is assembled by placing the knobs with the tube gripping element therein into the base and then bending down, onto the circular parts of the knobs, the band like parts 11 and 12. This holds all of the parts together and permits rotation of the knobs and the tube gripping elements embedded therein.

*In operation.*—The closed end of the tube C is first inserted into the device so that the end 30 extends into the space 27. A rotative movement of the knobs rotates the tube gripping element and, by that rotation, tends to wind the end of the tube onto the outside of the gripping element and, by that winding up, collapses the tube progressively and squeezes substance out of the tube through the opposite end thereof, the tongue 13 keeping the tube from rotating about the axis of the gripping element. Stopping and starting rotation of the knobs controls the discharge of substance from the tube.

The mounting of the tube gripping element shown in Fig. 6 answers the same purpose as that shown in Fig. 1 but the general structure of the device is modified by making all parts of the device, except the gripping elements of a composition material. In this structure, the gripping element is made of two pieces of metal, 31 and 32 with the spacing block 33 between them at each end thereof. The ends 34 and 35 are bent outwardly into corresponding grooves formed in the knobs so that the gripping elements rotate with the knobs when the latter are rotated. The tube is wound up on the gripping elements in the same manner as in Fig. 1.

The device shown and described is simple in structure and the parts are easily made and easily assembled. The device is easily installable when desired and is operated easily when installed or held in the hands. The knobs can be rotated in either direction so that the collapsed tube can be wound up either way; the members 13 and 16 preventing rotation of the tube in either direction.

Considerable paste like substance is saved by the use of the device; there need be no spilling of substance nor soiling a floor or washstand or the like and a paste receiving element can always be conveniently held at the open end of the tube.

Having described the present invention, I claim:—

1. A dispenser device including, oppositely spaced, rotatable members, and a gripping element having the corresponding ends thereof unrotatable in the corresponding rotatable member and including parallel gripping bars laterally spaced from each other.

2. A dispenser device including, a one piece metal base having an open side, a tongue projecting radially at the upper end of the opening, a device supporting portion at the lower end of the opening and having a part thereof bend upwardly and a hole therethrough to receive a device supporting screw.

3. A dispenser device including, a base adapted to be attached to a support, spaced knobs rotatable in said base, and parallel tube gripping members having the longitudinal ends thereof mounted in the respective of said knobs and being rotatable therewith.

PAUL A. SCHWERTNER.